Patented May 25, 1926.

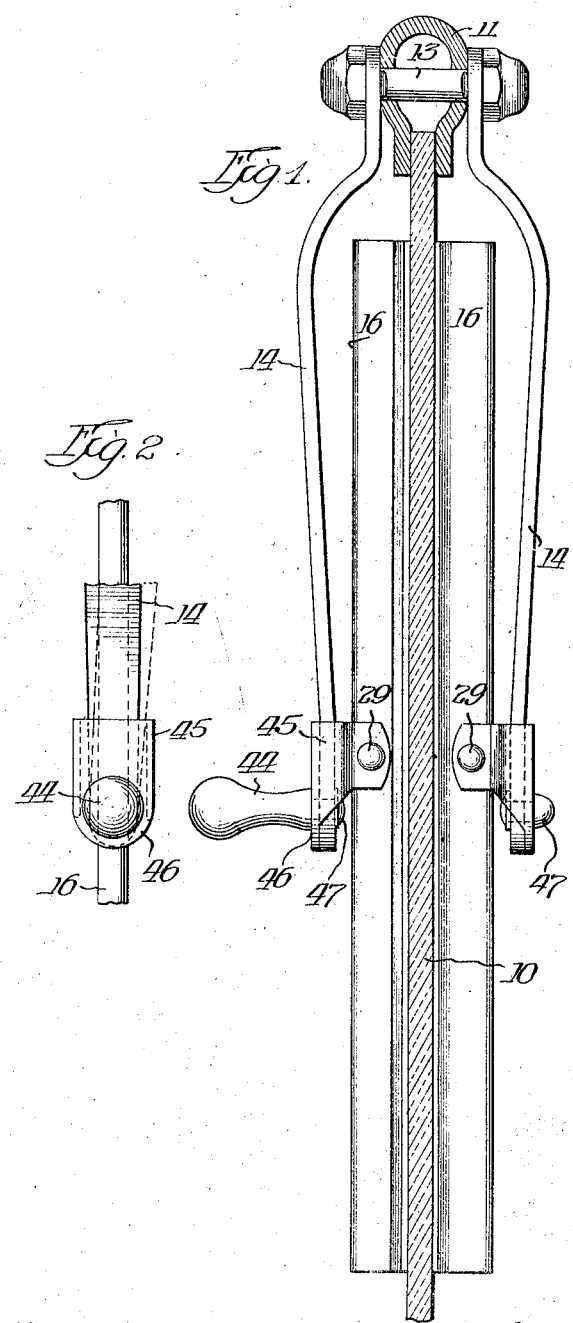

1,585,809

UNITED STATES PATENT OFFICE.

JOHN F. WHITE, OF CHICAGO, ILLINOIS, ASSIGNOR TO WHITE PRODUCTS COMPANY, OF CHICAGO, ILLINOIS, A CORPORATION OF ILLINOIS.

WINDSHIELD CLEANER.

Application filed February 1, 1922. Serial No. 533,172.

The present invention relates generally to cleaning devices for vehicle windshields, observation windows, and the like, and particularly has to do with devices of this character which are adapted for pivotal attachment in the frame bordering the surface to be cleaned.

The main and primary object of this invention is the provision, in a windshield cleaner of the type referred to, of improved means for permitting the wiping blades of the cleaner to move, at each end of their arcuate throw, into an inconspicuous position where they are in parallel contact with the inner periphery of the frame and accordingly out of the range of vision through the windshield.

Other objects and advantages of the invention not specifically referred to in this disclosure will be obvious upon a full understanding of the construction, arrangement and operation of the windshield cleaner as set forth in the following description and accompanying drawings.

The present disclosure is necessarily limited to the delineation of but one embodiment of the invention, but it will of course be understood that this particular embodiment is chosen primarily for the purpose of exemplification and accordingly should not be construed as limiting unnecessarily the spirit of the invention or scope of the appended claims.

In the drawings;

Fig. 1 is a side view of a cleaning deivce embodying the invention; and

Fig. 2 is a fragmentary front view of a portion of the cleaning device.

Referring now in detail to the drawings, the numeral 10 designates a windshield glass, or other surface to be cleaned, which has its upper periphery contained within a tubular metal frame 11.

The cleaning device is pivotally mounted within an aperture 12 of the frame 11 and comprises in general a pivoting portion 13, two curved resilient arms 14 rigidly attached to the portion 13 at the ends thereof, and two cleaning members 16 carried by the free ends of the arms 14 and bearing, under the pressure exerted thereon by the arms, against the glass 10 of the windshield.

The cleaning members 16 consist of long U-shaped metallic channels having strips of rubber or other suitable material contained therein to provide squeegees for wiping the surfaces of the windshield glass 10. The cleaning members are pivotally attached, at preferably points slightly below the middle points thereof, to spaced leg portions of U-shaped clips 45 by means of transfixing pins 29. The clips 45 are provided with lateral extensions 46 of their upper flat intermediate portions, and such extensions project a short distance down over the lower ends of the cleaning members 16. The lower free ends of the arms 14 are of less width than the inside diameters of the clips 45, and extend under the flat surfaces of the clips to points flush with the lower tips of the extensions 46. At points closely adjacent their lower extremities the arms 14 and extensions 46 of the clips are hinged together by pins 47 which pass through aligned apertures in both, thereby providing an offset castor joint between the arms and cleaning members wherein the pivotal axes in the joint are non-intersecting and are spaced longitudinally of the device. Due to the differences in width between the ends of the arms 14 and the inside diameters of the clips 45, the clips with their cleaning members will tend to lag behind the arms 14 slightly, as shown in dotted lines in Fig. 2 when the arms are moved across the glass 10. Because of this lag which is brought about by the castor adjustment just described, the cleaning members will have assumed the proper angle to the arms that is necessary in order to have them parallel to the frame when they reach the inner periphery of the same on either side of the pivoting point of the device. While two arms 14 with their associated cleaning members 16 are shown and described, it will be evident that the cleaner assembly may consist of only one arm with its associated cleaning member. The device may be operated by a handle 44 which may be secured to either one of the arms 14 adjacent the lower end thereof and preferably in axial alignment with one of the pins 47.

I claim:

1. In a device of the character described, an arm provided adjacent one end with means for effecting a pivotal mounting of the same in the frame bordering the surface to be cleaned, a cleaning member, a U-shaped clip having the opposed legs pivoted to said member intermediate the ends thereof, an extension of the intermediate portion of the clip at right angles to the leg portions thereof, and a pivotal connection between the extension and free end of the arm, whereby to provide an offset connection between the arm and member tending to change the position of the member relative to the arm upon movement of the arm in either direction.

2. In a device of the character described, an arm provided adjacent one end with means for effecting a pivotal mounting of the same in the frame bordering the surface to be cleaned, a cleaning member, a U-shaped clip carried by said member intermediate the ends thereof and embracing loosely the free end of said arm, an extension of the intermediate portion of the clip at right angles to the leg portions thereof, and a pivotal connection between the extension and free end of the arm, whereby to provide an offset connection between the arm and member tending to change the position of the member relative to the arm upon movement of the arm in either direction.

3. In a device of the character described, an arm provided adjacent one end with means for effecting a pivotal mounting of the same in the frame bordering the surface to be cleaned, a cleaning member, a saddle clip having an intermediate portion and two spaced leg portions, a pivotal connection between the arm and the intermediate portion of the clip, and a pivotal connection between the cleaning member and the leg portions of the clip.

4. In a device of the character described, an arm provided adjacent one end with means for effecting a pivotal mounting of the same in the frame bordering the surface to be cleaned, a cleaning member, a saddle clip adapted to straddle the arm and the cleaning member and having an intermediate portion and two spaced leg portions, a pivotal connection between the arm and the intermediate portion of the clip, and a pivotal connection between the cleaning member and the leg portions of the clip, the said pivotal connections being arranged perpendicularly to each other at points spaced longitudinally of the device.

5. In a device of the character described, an arm provided adjacent one end with means for effecting a pivotal mounting of the same in the frame bordering the surface to be cleaned, a cleaning member, a saddle clip having an intermediate portion and two spaced leg portions, a pivotal connection between the arm and the intermediate portion of the clip, and a pivotal connection between the cleaning member and the leg portions of the clip, the said pivotal connections being arranged perpendicularly to each other at points spaced longitudinally of the device.

In testimony whereof I have hereunto subscribed my name.

JOHN F. WHITE.